April 29, 1947.  J. M. CAUGHEY  2,419,884
SEAT HAVING A RESILIENTLY MOUNTED BACK REST
Filed Oct. 4, 1944  3 Sheets-Sheet 1
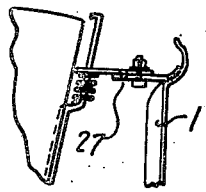
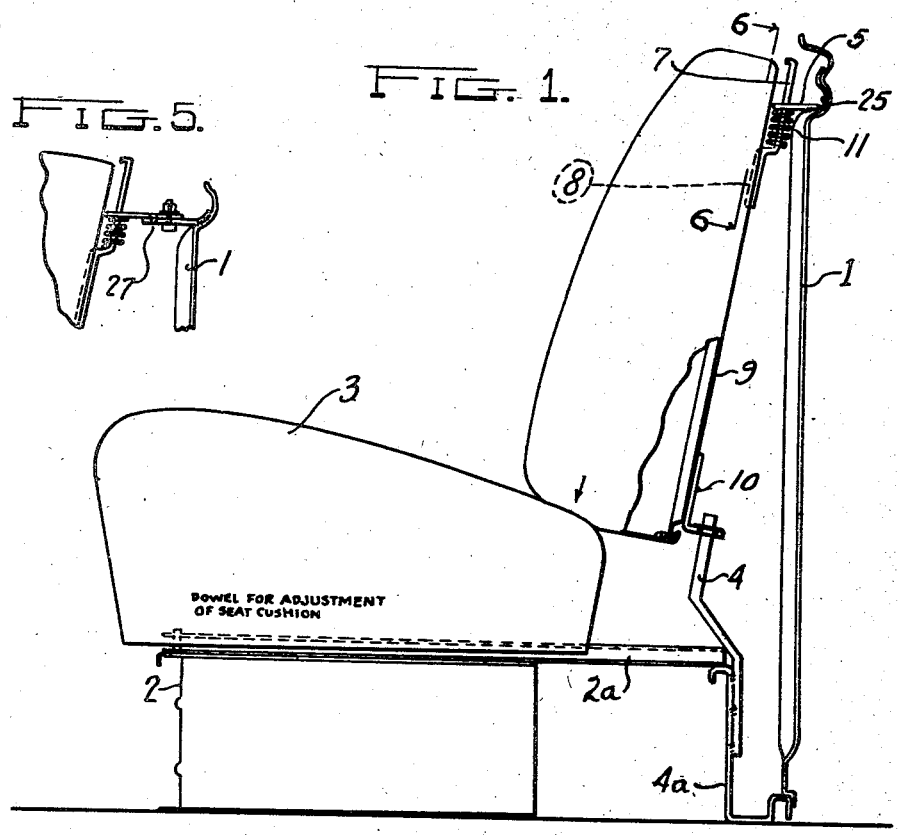
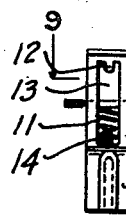
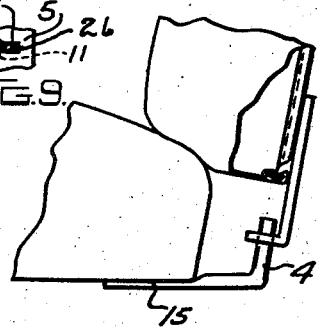
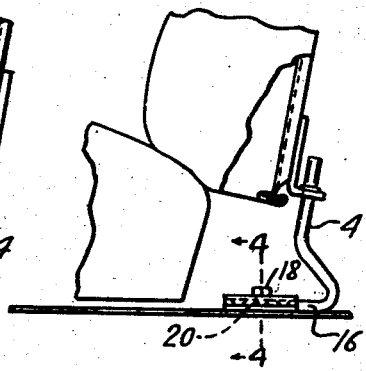
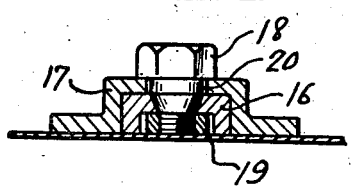
INVENTOR.
John M. Caughey
BY
Barnes, Kisselle, Laughlin & Raisch
Attorneys

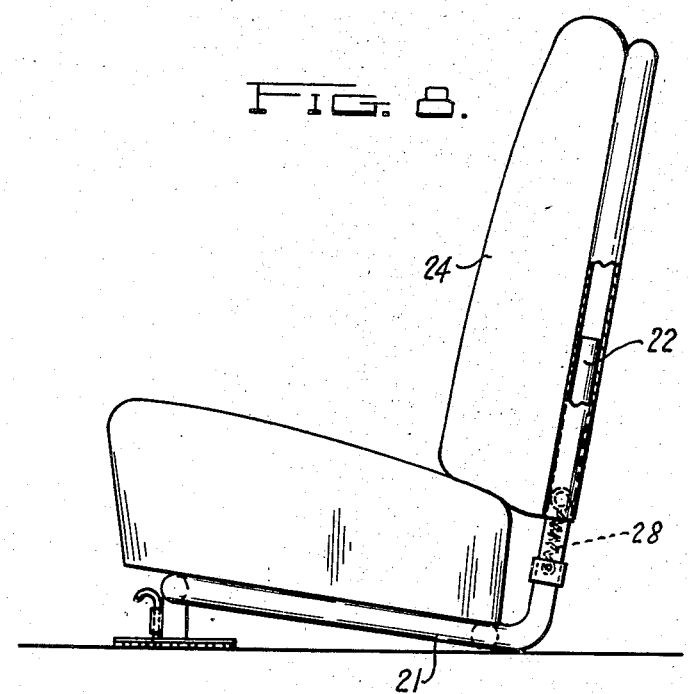
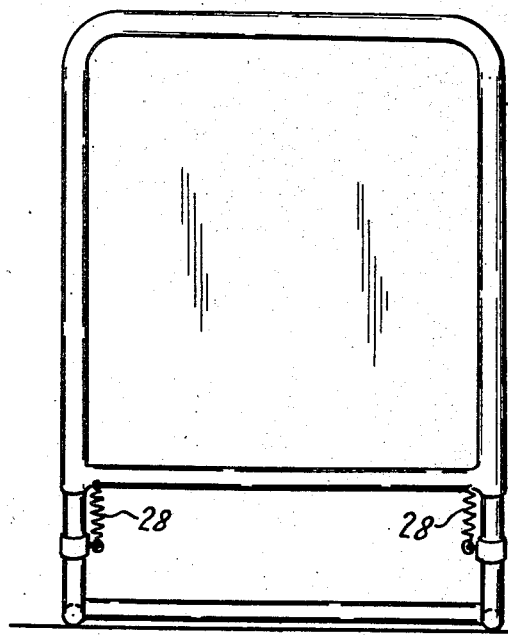

April 29, 1947.  J. M. CAUGHEY  2,419,884
SEAT HAVING A RESILIENTLY MOUNTED BACK REST
Filed Oct. 4, 1944  3 Sheets-Sheet 3

INVENTOR.
John M. Caughey
BY
Barnes, Kisselle, Laughlin + Raisch
Attorneys

Patented Apr. 29, 1947

2,419,884

UNITED STATES PATENT OFFICE 2,419,884

SEAT HAVING A RESILIENTLY MOUNTED BACK REST

John M. Caughey, Adrian, Mich., assignor to Stubnitz-Greene Spring Corporation, Adrian, Mich., a corporation of Michigan Application October 4, 1944, Serial No. 557,074

2 Claims. (Cl. 155—164)

This invention relates to seat springs and has for its object an arrangement of the seat back spring cushion with respect to the seat bottom spring cushion so that one occupying the seat is not thrown up and down so that his clothes and body are caused to rub up and down on the seat back cushion surface. The seat back cushion is kept in close contact at all times with the top of the seat bottom cushion so that one's clothes do not become caught in between the seat back cushion and the seat bottom cushion.

While it is not new to so mount a seat back cushion that it can move up and down with the movement of the body of the seat occupant, so far as I am aware the seat bottom cushion and such a sliding seat back cushion have never been so related and so arranged that at all times the seat back cushion is in close contact with the seat bottom cushion so as to properly lock these together to prevent things resting on the seat bottom cushion from falling in between the cushions and from preventing one's clothes getting caught between the cushions where they may be pinched and mussed. In one form of my invention the whole seat can be adjustable forwardly and rearwardly.

Referring to the drawings:

Fig. 1 is a side elevation of an automobile seat showing one form of my invention. The seat bottom cushion is adjustable forwardly and rearwardly; the seat back cushion is not adjustable forwardly and rearwardly.

Fig. 2 is a fragmentary detail showing how the seat back cushion and seat bottom cushion are united and the two can be adjusted forwardly and rearwardly together.

Fig. 3 is a similar detail showing an arrangement wherein the seat back cushion is adjustable independently of the seat bottom cushion.

Fig. 4 is a section on the line 4—4 of Fig. 3.

Fig. 5 is a fragmentary detail showing an arrangement for adjusting the seat back cushion forwardly and rearwardly at the top of the seat back.

Fig. 6 is a section on the line 6—6 of Fig. 1.

Fig. 7 is a rear elevation showing a modified form of my invention.

Fig. 8 is a side elevation of the same.

Fig. 9 is a section on the line 9—9 of Fig. 6.

Figure 10:
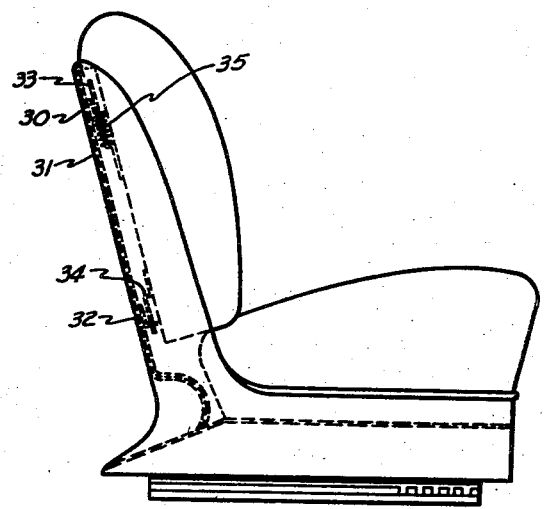
Figs. 10 and 11 show an adaptation of the invention for passenger cars.

I designates one of the sheet metal backs of a cab. 2 designates a box or support arranged to support the seat bottom cushion 3 which is slidable on the tracks 2a. Fastened to an angle iron bracket 4a is an upright bracket or post 4. This angle iron bracket rests on the floor and has a hook at the rear to which is welded the sheet metal back 1. Spot welded to the upper channel portion 25 of back 1 is a plate 5. Secured to the back of the seat back cushion frame is a hook-like bracket 7, shown in detail in Figs. 6 and 9. This is provided with an offset portion 8 which may be welded or otherwise secured to the seat back frame 9. Support 2 supports a track 2a which extends rearwardly and has its rear end supported on bracket 4a.

At the bottom of the seat back frame there is welded thereto an angle bracket 10 having an eye adapted to be threaded over the post 4. A spring 11 is seated on the hook-like bracket 7 before the seat back is put in place, the spring 11 being, when expanded, centered at the top by the nub 12 (Fig. 6). This hook-like bracket has a central slot 13. The spring is centered at the bottom by an upward projection 14 on the bracket. When the seat back spring is shipped by the manufacturer it has this bracket and spring assembled in place and also the angle bracket 10. The post fixture 4 and the plate 5 are welded to the cab structure by the automobile manufacturer or they can be put on after the cab has left the factory.

The hooked bracket 7 may be hooked up through the slot 26 in the plate 5, the seat back being then in horizontal position, and then the seat back is turned to upright position and the bracket is pushed up through the plate. Spring 11 will then be depressed by plate 5 and then the perforated angle bracket 10 may be threaded over the post 4. The seat bottom 3 may then be put in place and pushed under the seat back cushion, as shown in Fig. 1.

By reason of the mounting of the seat back, as already described, the seat back cushion can move up and down with the movements of the body of the rider. The seat back cushion, by reason of the pressure of spring 11, is always pushed tightly down against the seat bottom cushion, as shown in Fig. 1, and always remains in this position regardless of the movement of the body of the rider because ordinarily the rider will never be thrown above the upper surface of the seat bottom cushion. There is a tight engagement between the seat bottom cushion and the seat back cushion and small articles cannot slide or creep down in between the cushions to the annoyance of the rider, as is often the case. Then again, this close contact between the two cushions prevents the rider's clothes from getting caught between the cushions and becoming pinched and tangled in the cushions.

In the showing in Fig. 1, the seat back cushion is not adjustable forwardly, but the seat bottom cushion has a dowel adjustment. In Fig. 5 the seat back cushion may be adjustable forwardly, by making the plate bracket in two sections so that the spacing of the seat back from the cab frame may be altered. The plate sections may one or both have a plurality of bolt openings 27, as shown in Fig. 5, to alter the adjustment and spacing. The seat bottom may or may not be adjustable coincidentally with the seat back frame.

In Fig. 2 the post 4 has a base portion 15 which is welded to the seat bottom frame and, therefore, the two may be adjusted together.

In Figs. 3 and 4, the bottom of the seat back cushion is adjustable independently of the seat bottom by means of a base 16 on the post 4 which is in the form of a channel, as shown in Fig. 4, and this channel may be adjusted along the floor bracket 17 by means of the bolt 18 and nut 19, there being a plurality of holes 20 in the floor bracket to take the bolt 18, as shown in Fig. 3.

Figs. 7 and 8 show another form of the invention, adapted for passenger car use, with independent seats. The seat frame here is shown as a tubular frame 21 with upstanding members 22. A tubular frame 23 telescopes over the upright members 22, as shown in Fig. 8, and the tractile springs 28 engage between the tubular seat back frame and the seat bottom frame 22 and thereby continually pull the seat back cushion down on the seat bottom cushion, as shown in Fig. 8.

Figure 11:
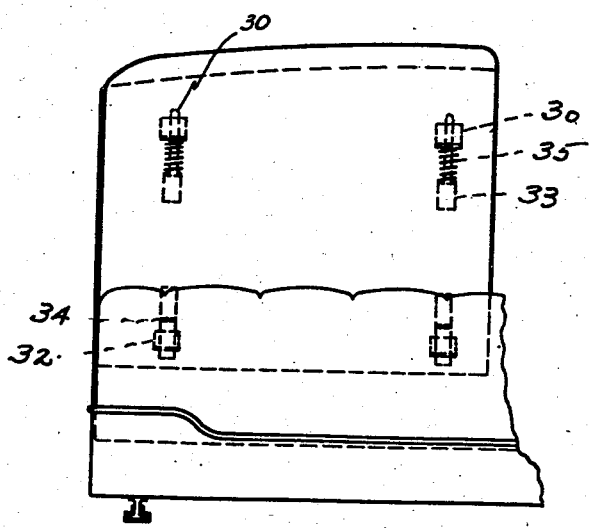

In Figs. 10 and 11 another modified form of the invention as applied to passenger car seats is shown. Here the hooked bracket 33 hooks into the angle bracket 30 which is welded to seat back 31. A spring 35 bears against angle bracket 30 and pushes downwardly on the hooked bracket 33 to hold the seat back cushion downwardly against the seat bottom cushion. Angle bracket 34 hooks into bracket 32 at the lower end of the seat back cushion.

What I claim is:

1. A seat assembly for use in a vehicle, comprising a horizontal slotted plate, means supporting said plate near the top of the seat back and behind the same, a seat bottom cushion, supporting means therefor, a post, means supporting said post in upright position, the seat back cushion provided near its lower end with a horizontal perforated bracket threaded over said post and provided near its upper end with a bracket with an offset portion interengaged with the slot in the said top plate to form with the lower bracket and post a guiding means for upward and downward movement of the seat back cushion and a spring engaging between the said plate and offset bracket for yieldingly causing the said seat back cushion to tend downward and into contact at its lower end with the seat bottom cushion.

2. A seat assembly for use in a vehicle, comprising a horizontal slotted plate, means supporting said plate near the top of the seat back and behind the same, a seat bottom cushion, supporting means therefor, a post, means supporting said post in upright position, the seat back cushion provided near its lower end with a horizontal perforated bracket threaded over said post and provided near its upper end with a bracket with an offset portion interengaged with the slot in the said top plate to form with the lower bracket and post a guiding means for upward and downward movement of the seat back cushion and a spring engaging between the said plate and offset bracket for yieldingly causing the said seat back cushion to tend downward and into contact at its lower end with the seat bottom cushion, the said horizontal plate comprising two sections releasably clamped together and thereby adjustable whereby the position of the seat back may be altered.

JOHN M. CAUGHEY.

REFERENCES CITED

The following references are of record in the file of this patent:

UNITED STATES PATENTS

| Number | Name | Date |
| --- | --- | --- |
| 1,188,537 | Frankel | June 27, 1916 |
| 1,192,692 | Schramm | July 25, 1916 |
| 1,742,540 | Hilburger | Jan. 7, 1930 |

FOREIGN PATENTS

| Number | Country | Date |
| --- | --- | --- |
| 450,839 | Britain | 1936 |
| 607,932 | France | 1926 |